United States Patent Office 3,355,430
Patented Nov. 28, 1967

3,355,430
AMINOPLAST TEXTILE FINISH PREPARED BY CO-REACTING FORMALDEHYDE, UREA AND AMINOETHANOL
Kenneth Herald Remley, Warren Township, Somerset County, N.J., and Joseph Richard Anghinetti, Kennebunkport, Maine, assignors to American Cyanamid Company, Stamford, Conn., a corporation of Maine
No Drawing. Filed Nov. 12, 1964, Ser. No. 410,789
4 Claims. (Cl. 260—70)

This invention relates to a water-soluble aminoplast finish for cellulosic textile materials and more particularly to water-soluble aminoplasts of the type suitable for use on cellulosic textile materials to impart crease-proofing or crease resistant properties thereto.

Urea formaldehyde condensates and 5-substituted triazone-formaldehyde condensates have, in the broad sense, been recognized as reactants for textile materials including the crease-proofing agents for cellulosic textile materials for some considerable time. Typical of the patents demonstrating the degree of development in the preparation and use of urea formaldehyde condensates and triazone-formaldehyde condensates as crease-proofing agents include U.S. Patents 2,901,463, 2,917,411, 3,002,559 and 3,067,062.

We have now discovered that a particularly valuable water-soluble aminoplast of the type highly suited and valued for use as a textile finish can now be prepared in a "one kettle" process by reacting urea formaldehyde and 2-hydroxyethylamine i.e., 2-aminoethanol under specific critical conditions as to the ratios of reactants, pH and temperature. The final product for purposes of general reference may be considered to comprise a mixture of 1,3-dimethylol-5-(2-hydroxyethyl)-tetrahydrotriazone and a polymethylolated urea having at least three moles of combined formaldehyde. As noted, such a description is only for purposes of general reference for, as will be demonstrated hereinafter, simple physical blends of such reactants do not duplicate application properties of the products prepared in accordance with this invention.

Specifically the aminoplasts of this invention are prepared by reacting in an aqueous medium relative amounts of one mole of urea with from 3.5 to 4 moles and preferably from between 3.6 to 3.9 moles of formaldehyde and between .4 and .8 mole and preferably from between .5 and .7 mole of aminoethanol. These materials are reacted for a preliminary period of from 60 to 180 minutes and preferably from 75 to 105 minutes at a temperature of from 70 to 100° C. and preferably from 85 to 95° C. During the reaction period the principal reaction that is believed to take place is the formation of the triazone.

After the above specified reaction period, sufficient strong alkali such as sodium, potassium, or lithium hydroxide is added to the reaction mass in such a manner as to continuously provide a pH of at least 9.7 and preferably at least 10. While maintaining the pH of the reaction mixture at at least 9.7 the temperature is maintained at from 50 to 80° C. and preferably from 60 to 70° C. This reaction is carried to completion under the above conditions until the unreacted formaldehyde content is less than 4%.

The reaction mixture is then cooled to ambient temperature and sufficient acid is added to adjust the pH to from 6.5 to 7.5. If desired, the solids content can be adjusted to a lower value by the addition of water.

In a particularly preferred procedure, relative amounts of one mole of urea and 3.8 moles of formaldehyde as 44% formalin solution are combined. To this mixture is added .5 mole of 2-aminoethanol at a rate which permits the exotherm to heat the reaction mixture to 70° C. When the exotherm subsides, the mixture is heated to 90° C. and held there for about 90 minutes. .05 mole of caustic soda is then added uniformly while the temperature of the reaction mixture is held at 70° C. for a period of 60 minutes.

In carrying out the present process, it is convenient to employ technical grades of formalin solutions ranging from 35 to 45% formaldehyde concentrations but other sources of formaldehyde may be employed.

The products of this invention are water white liquids having a pH of from 6.5 to 7.5 and contain of from 50 to 90%, preferably from 55 to 80% of the triazone component on the solids basis, the principal remaining component believed to be a polymethylol urea formaldehyde containing at least three moles of combined formaldehyde.

The critical features of the present process are believed to be as follows:

(1) The usage of formaldehyde with respect to the amount of urea used.

(2) Introducing all of the formaldehyde at the start of the reaction.

(3) The usage of alkali, that is operation of what is believed to be essentially the methylolation reaction at a sufficiently high pH.

Other procedures for carrying out the reaction which do not adhere to the three critical limitations on applicants' process set forth above failed to provide satisfactory products. For example, the use of one or two moles of formaldehyde per mole of urea during the initial reaction with the addition of three or two moles of formaldehyde respectively, after the reaction with the amine or when the triazone is believed to be formed does not provide a satisfactory product. As stated earlier, physical blends of highly methylolated ureas as for example those containing from between 3.2 and 3.6 moles of combined formaldehyde and 1,3-dimethylol-5-(2-hydroxyethyl)-tetrahydrotriazone do not provide equivalent finishing properties. In addition, products prepared which otherwise adhere to the other process limitations of applicants' invention but in which the methylolation is carried out at a lower pH are not equivalent in finishing properties to those of this invention.

The aminoplast product of this invention impart desirable durable properties to cellulosic textile materials providing finished fabrics with excellent minimum care properties. In addition a desirable relationship between wrinkle recovery and strength loss, particularly strength loss due to chlorine retention and scorching are provided.

Textile finishes of the triazone and urea types are commercially important, in part for economic reasons. In several ways triazones are superior to the urea based finishes but are more costly. Thus, blends of the two types of aminoplasts have been proposed. Until now it has been necessary to employ high proportions of the more costly triazone component in order to obtain the better balance of wrinkle recovery and strength loss. The product prepared by the process of this invention produces products equal to the prior blends in properties imparted to the fabric but can be prepared so as to have a lower content of the more costly triazone. In addition the product of this invention may be characterized as having a lower content of free formaldehyde.

As noted the products of this invention are useful in imparting wrinkle recovery and shrinkage control to cellulosic textile materials and as such may be applied to these materials by any of the conventional procedures known in the textile industry. Thus, they may be applied by padding, dipping, spraying, emersing and the like. Regardless of the method of application, amounts of between 1 and about 25% and preferably between about 3 and 10% of the product on a solids basis are applied to the textile material based on its dry weight. After application of the aminoplast composition the treated material is dried and cured to impart wrinkle resistance and shrinkage control thereto. Normally curing is effected by means of a curing catalyst or accelerator which may be free acids, acid salts, alkanolamine salts, metal salts and the like. The concentration of catalyst employed may range from about 0.1 to about 25% or higher based upon the weight of resin solids. Of the types of catalysts identified above the preferred catalyst is zinc nitrate which when used in larger amounts than normal, as for example from 6 to about 30% and preferably in amounts from between about 10 to 20% based on the resin solids, produces a superior finish. The following are illustrative of other catalysts which may be employed: free acids such as phosphoric, lactic, tartaric, oxalic acids; acid salts such as ammonium chloride; amine salts such as alkanolamine salts like diethanolamine hydrochloride; metal salts such as magnesium chloride, zinc chloride, aluminum chloride and the like.

Following the application of the aminoplast composition and curing accelerator to the cellulosic textile material, the material is normally subjected to drying and curing operations to effect the desirable wash and wear properties of crease-resistance and shrinkage control. The drying and curing operation may be carried out in a single step or in separate steps. The temperature at which the drying and curing operations are effected can vary widely and are influenced to some extent by the type of catalyst employed. Normally the range of temperature extends from about 180° F. to about 450° F. or even higher. Generally speaking the time of the drying and/or curing operation is inversely proportional to the temperature employed and of course is influenced by whether or not separate or combined drying and curing steps are employed.

Generally when drying and curing is carried out as a combined operation in time, from about 1 minute to about 10 minutes may be employed at temperatures of from about 450 to 250° F., respectively. When the fabric has been dried preliminary to curing, curing times on the order of 5 minutes to about ¼ minute at a temperature from between 250 and 450° F. respectively may be employed.

It should be noted that by the expression "cellulose-containing textile material" and similar expressions as they are employed herein, it is meant fibers, yarns, filaments, formed fabrics, whether knitted, woven, non-woven, felted or otherwise formed, which contain at least 50% of cellulosic fibers as for example cotton, viscose rayon, linen, flax, jute, ramie and the like. These cellulosic textile materials may be employed in combinations with other known textile materials as for example they may be blended with other natural or synthetic fibers as for example silk, wool, the acrylic and polyester fibers, the nylons and the like.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

Example 1

A suitable reaction vessel is charged with 6875 parts (100 moles) of 44% formalin and 1500 parts (25 moles) of urea. 2-aminoethanol (825 parts, 13.5 moles) is added over a period of about 20 minutes, the temperature of the reaction mixture rising from about 20° C. to about 80° C. The reaction mixture is then heated to 90° C., and the temperature is maintained at 90° C. for 90 minutes. The reaction mixture is cooled to about 70° C. and 37 parts of 50% aqueous sodium hydroxide is added (pH about 9.8). While maintaining the temperature at about 70° C., two more portions (37 parts each) of 50% aqueous sodium hydroxide are added at 20 minute intervals (pH about 10.4 and 10.6). About 20 minutes later, the temperature is lowered to 50° C. and sufficient nitric acid (about 65 parts of 70% aqueous nitric acid) is added to provide a pH of about 7.0. After further cooling, the solids content is adjusted to about 50% by addition of water.

It should be noted that based on the amount of 2-aminoethanol used, the product corresponds to a composition containing about 60% of triazone and 40% of methylolated urea.

Example 2

An aqueous pad bath containing 6.25% of the product of Example 1 on a "resin solids" basis and 10% of zinc nitrate based on the weight of the resin solids is applied by normal padding procedures to 80 x 80 cotton percale employing a microset padder adjusting to provide an 80% wet pickup of pad bath solution. The treated fabric, containing 5% O.W.F. of the product of Example 1 on a resin solids basis, is dried for one minute at 225° F. and is then heated for one minute at 350° F. The fabric is process washed with water containing 0.5% of a nonionic surface active agent, the condensation product of nonylphenol with 9 moles of ethylene oxide, and 1.0% of sodium carbonate, followed by a water rinse and drying.

Samples of the treated and untreated fabrics are tested for wrinkle recovery and strength loss due to chlorine retention. The results are shown in Table I.

The wrinkle recovery of the fabrics is measured by Tentative Test Method 66–1959T of the American Association of Textile Chemists and Colorists.

The laundering operation involves washing the fabric at 212° F. with water and soap according to Procedure IV of Tentative Test Method 96–1960T of the American Association of Textile Chemists and Colorists.

The strength loss due to retained chlorine is measured by Standard Test Method 92–1962 of the American Association of Textile Chemists and Colorists.

TABLE I

| | Untreated Fabric | Treated Fabric |
|---|---|---|
| Wrinkle Recovery: Degrees, W+F: | | |
| Initial | 168 | 255 |
| After laundering | 185 | 259 |
| Chlorine Retention, After Laundering: Warp Tensile Strength, p.s.i.: | | |
| Initial | 60 | 41 |
| After "chlorine and scorch" | 60 | 40 |

Under similar conditions, a polymethylolurea containing 3.4–3.5 moles of combined formaldehyde, will provide a wrinkle recovery of about 250°–260° and tensile strength initially and after "chlorine and scorch" of about 40 and 20 p.s.i., respectively.

Example 3

(A) Product of Example 1.
(B) Mixture of about 60% of 1,3-dimethylol-5-(2-hydroxyethyl)triazone and about 40% of polymethylolurea containing about 3.2–3.3 moles of combined formaldehyde per mole of urea, said polymethylolurea being a mixture of dimethylolurea and a methylolurea containing 3.4–3.5 moles of combined formaldehyde per mole of urea.

A and B are applied to 80 x 80 cotton percale according to the procedure of Example 2 using a "cure" temperature of 300° F. and with omission of the process wash.

Samples of treated and untreated fabrics are tested for wrinkle recovery and strength loss due to chlorine retention. The results are shown in Table II.

The wrinkle recovery and strength loss due to retained chlorine are measured by the procedures of Example 2.

The "laundering" involves washing the fabrics at 160° F. with water and soap.

TABLE II

|  | Untreated Fabric [1] | Fabric Treated With A | Fabric Treated With B |
|---|---|---|---|
| Wrinkle Recovery: Degrees, W+F: |  |  |  |
| Initial | 175 | 268 | 243 |
| After 5 launderings | 178 | 250 | 233 |
| Chlorine Retention, After 5 launderings: |  |  |  |
| Tensile Strength, p.s.i.: |  |  |  |
| Initial | 57 | 42 | 43 |
| After "chlorine and scorch" | 54 | 34 | 14 |

[1] The fabric was used for the "A" treatment. The fabric used for the "B" treatment gave very similar results; namely, 178, 188, 56, 55, reading from top to bottom.

This example shows that a simple physical mixture is not equivalent to the product of Example 1.

What is claimed is:

1. A process for preparing a water-soluble aminoplast comprising reacting in an aqueous medium relative amounts of 1 mole of urea with between 3.5 and 4.0 moles of formaldehyde and between .4 and .8 mole of 2-aminoethanol at a temperature between from 70° C. to 100° C. for from 60 to 180 minutes, continuing the reaction thereafter at a temperature from 50 to 80° C. in the presence of sufficient alkali metal hydroxide to maintain a pH of at least 9.7 until the unreacted formaldehyde content of the reaction mixture is less than 4%.

2. A process for preparing a water-soluble aminoplast comprising reacting in an aqueous medium relative amounts of 1 mole of urea with from 3.6 to 4 moles of formaldehyde and between 0.5 and 0.7 mole of 2-aminoethanol at a temperature of from 85° C. to 95° C. for from 75 to 105 minutes, continuing the reaction thereafter at a temperature of from 60° to 70° C. in the presence of sufficient alkali metal hydroxide to maintain a pH at least 10 until the unreacted formaldehyde content of the reaction mixture is less than 4%.

3. A process for preparing a water-soluble aminoplast comprising reacting in an aqueous medium relative amounts of 1 mole of urea with from 3.6 to 4 moles of formaldehyde and between 0.5 and 0.7 mole of 2-aminoethanol at a temperature of from 85° C. to 95° C. for from 75 to 105 minutes, continuing the reaction thereafter at a temperature of from 60° to 70° C. in the presence of sufficient sodium hydroxide to maintain a pH of at least 10 until the unreacted formaldehyde content of the reaction mixture is less than 4%.

4. A water-soluble aminoplast prepared according to the process of claim 1.

References Cited

UNITED STATES PATENTS 2,917,411  12/1959  Kress _____ 117—139.4

WILLIAM H. SHORT, *Primary Examiner.*

H. SCHAIN, *Assistant Examiner.*